United States Patent [19] [11] 3,755,247
Mathis et al. [45] Aug. 28, 1973

[54] ORGANO PHOSPHITE AND NICKEL COMPLEX UV LIGHT STABILIZER SYSTEM

[75] Inventors: Ronald D. Mathis, Taylors; James S. Dix, Greenville, both of S.C.

[73] Assignee: Phillips Petroleum Company, Bartlesville, Okla.

[22] Filed: Jan. 10, 1972

[21] Appl. No.: 216,741

[52] U.S. Cl..... 260/45.75 N, 252/401, 260/45.95 D
[51] Int. Cl. ........................................... C08f 45/62
[58] Field of Search.............. 260/45.75 N, 45.95 D; 252/401

[56] References Cited
UNITED STATES PATENTS

| 3,167,526 | 1/1965 | Nicholson | 260/45.7 |
| 3,412,064 | 11/1968 | Brindell | 260/45.95 |
| 3,379,680 | 4/1968 | O'Konski | 260/45.75 |
| 3,655,718 | 4/1972 | Schutze et al. | 260/45.95 |

Primary Examiner—Donald E. Czaja
Assistant Examiner—V. P. Hoke
Attorney—Quigg & Oberlin

[57] ABSTRACT

The effectiveness of nickel amine complexes of bisphenol sulfides as ultraviolet light stabilizers for polymers is enhanced by the further presence of a small amount of a phosphite extended t-alkylated bisphenol A.

10 Claims, No Drawings

3,755,247

ORGANO PHOSPHITE AND NICKEL COMPLEX UV LIGHT STABILIZER SYSTEM

FIELD OF THE INVENTION

This invention relates to methods to improve the effectiveness of nickel amine complexes as ultraviolet stabilizers for polymers. It further relates to improved stabilized polymer compositions.

Many polymers are subject to deteriorative action of ultraviolet light and hence need effective stabilization for satisfactory service life. Ultraviolet light tends to cause, for example, severe losses of tenacity in fibers, and early development of embrittlement in films, sheets and the like. Nickel complexes, such as those of the thiobisphenols or bis-phenol sulfides, have been widely used as ultraviolet light stabilizers for various polymers. However, to produce polymers of sufficient service life to be commercially acceptable and competitive requires still further improvement in stabilization against the deteriorative effects of ultraviolet light.

SUMMARY OF THE INVENTION

We have discovered that certain organophosphite type additives exercise a surprising degree of assistance to nickel complexes in stabilizing polymers against deteriorative effects of ultraviolet light.

More particularly, the organophosphites which are phosphite extended t-alkylated bisphenol A compounds improve to a surprising degree of effectiveness of nickel amine complexes for polymer stabilization.

It is an object of our invention to improve the effectiveness of nickel complexes in stabilizing polymers. It is a further object of our invention to provide improved stabilized polymer compositions.

DETAILED DESCRIPTION OF THE INVENTION

Our invention lies in the improved stabilization of polymers by the use of a combination of a nickel complex together with an organophosphite, particularly a phosphite extended t-alkylated bisphenol A.

The organophosphite additives can be represented by:

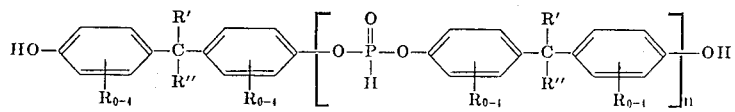

wherein each R, R', and R'', is hydrogen or hydrocarbyl, and where hydrocarbyl is alkyl, cycloalkyl, aryl, aralkyl, and alkaryl, containing up to 20 carbon atoms per each such group. The several groups can be alike or can each differ one from the other. The number of R groups per ring can vary from 0 to 4. The structure indicated by the brackets in the formula above can be repeated such that the integer n can range from 1 to about 5.

The presently preferred organophosphite is one in which R is t-butyl, $n = 1$, and R' and R'' each is a methyl group. The preferred structure can be made by extending bisphenol A, i.e., p,p'-isopropylidenediphenol, with a phosphorous compound such as dichlorophosphorous acid. A transesterification reaction can be used between a dialkyl phosphite such as dimethyl phosphite and bisphenol A or substituted bisphenol A to produce additives of our invention.

The amount of the organophosphite additive used according to our invention is that amount which is effective to enhance the effectiveness of the nickel complex. Such an amount broadly will be in the range of from about 0.01 to 1.0 parts of our additive per 100 parts polymer, php, excluding nickel complex, and excluding other additives often added to polymeric compositions for a variety of purposes as known to the art. Either a single organophosphite additive can be used, or mixtures of two or more.

The weight ratio of nickel complex to organophosphite additive can vary broadly, such as over about 20:1 to 1:1, preferably 15:1 to 2:1. The total amount of nickel complex plus organophosphite additive used in the polymer for stabilization can vary widely. From about 0.03 to 5 parts of stabilizer system will be effective per 100 parts of polymer, excluding other additives normally added to the polymers.

Any nickel complex known to the art as a polymer ultraviolet light stabilizer can be improved when used in combination with our organophosphite additive. Frequently used as stabilizers are the nickel amine complexes of bis-phenol sulfides, sometimes termed nickel complexes of thiobis-phenols. More particularly, such nickel complexes are nickel amine complexes of the 2,2'-thiobis-4-alkylphenols. A single nickel complex can be used, or two or more. A presently preferred nickel amine complex is 2,2'-thiobis-4-t-octyl-phenol complex with n-butylamine in a 1:1 molar ratio, [2,2'-thiobis(4-t-octyl-phenolato)] n-butylamine nickel (II).

Such nickel complexes are prepared by reacting the nickel salt of 2,2'-thiobis-p-alkylphenol, wherein the alkyl radical can be cyclic or can be an open chain moiety, preferably as the 1:1 aquo complex with a suitable amine in an inert volatile organic solvent, such as benzene, chloroform, ether, acetone, and the like. The solvent can be removed by conventional means, leaving a substantially pure solid nickel amine complex. The 2,2'-thiobis-p-alkylphenols themselves are well known compounds and can easily be prepared by known means such as reaction of a p-alkylphenol with such as $SCl_2$. The desired 1:1 aquo complexes are prepared by reacting a nickel salt with 2,2'-thiobis-p-alkylphenol in an aqueous alcoholic medium in the presence of an acid binder such as sodium acetate.

Examples of useful p-alkylphenol sulfides are:
bis(p-t-octylphenol)sulfide,
bis(p-butylphenol)sulfide,
bis(p-cyclohexylphenol)sulfide,
bis(p-nonylphenol)sulfide,
bis(p-ethylphenol)sulfide,
bis(p-amylphenol)sulfide,
bis(p-t-dodecylphenol)sulfide and
bis(p-octadecylphenol)sulfide.

Examples of amines useful to form such amine complexes include ammonia; primary aliphatic amines such as methylamine, ethylamine, propylamine, laurylamine, butylamine, amylamine, octylamine and octadecylamine; primary aromatic amines such as aniline, anisidine, toluidine, 1-naphthylamine, 2-naphthylamine, p-dodecylaniline, p-butylaniline, xylidene and p-octyloxyaniline; and cyclic secondary amines such as morpholine, hexamethyleneimine, piperazine and piperidine. The amines also may contain a hydroxyl group such as is exemplified by triethanolamine and the like.

Nickel complexes are used for the stabilization of polymers over a broad concentration, though in minor amount relative to the amount of polymer. Such a broad range can be from about 0.02 to 2.5 php, more usually from 0.2 to 2 php, parts of nickel complex per 100 parts of polymer excluding other additives.

The stabilizers themselves, the organophosphite additive and the nickel complex, can be incorporated or mixed with the polymers by any suitable method known to the art for incorporating additives or additive combinations into polymeric materials.

For example, the stabilizers can be incorporated into polymer formulations by dry-blending with polymer powders or pellets such as in tumble mixers, Henschel mixers, and the like. This can be followed by additional mixing in a screw extruder, Banbury mixer, Brabender mixer, roll mills, etc., and the like, to blend the stabilizers with a molten polymer or polymeric product.

The stabilizers can be sprayed onto a polymer powder from a solution or dispersion such as from acetone, methanol, cyclohexane, aromatic hydrocarbon such as benzene, and the like, prior to pelletizing of the polymeric composition such as by extrusion. Solvent used for such dispersions usually is removed by evaporation from the treated polymer prior to extrusion. However, it is feasible to extrude the solvent-wetted polymer-stabilizer admixture using such as a devolatilizing extruder so as to remove the solvents as vapors.

Certainly, conventional additives such as fillers, pigments, fibers, reinforcements, other stabilizers of various types, plasticizers, thermal stabilizers such as the hindered phenols sold in the trade as Irganox 1076 octadecyl[3-(3,5-di-tert-butyl-4-hydroxyphenyl)]propionate, and Irganox 1010 tetrakis[methylene(3,5-di-tert-butyl-4-hydroxyhydrocinnamate)]methane; 2,6-di-tert-butyl-4-methylphenol known as BHT; thio-dipropionic acid esters such as dilauryl thiodipropionate and distearyl thiodipropionate; other processing aids such as calcium stearate, and the like, all can be incorporated as desired with the polymers for various purposes and by methods known to the art.

The protective system we have developed for protecting polymers is employed with normally solid polymers, including homopolymers, copolymers, belnds of a variety of two or more polymers or copolymers, such as polymers of the aliphatic 1-olefins, the polystyrenes and other poly(vinyl-substituted aromatic compounds), poly(vinyl halides) such as poly(vinyl chloride), poly(vinylacetate)s, polyamides, polyesters, and the like, in which nickel complexes are used as stabilizers.

Polymers of the 1-olefins include those in general of the 1-monoolefins having from two to eight carbon atoms per molecule, include homopolymers of such as ethylene, propylene, or octene, copolymers of two or more such 1-olefins, blends or mixtures of two or more polyolefins, and the term includes copolymers of one or more 1-monoolefin copolymerized with other monomers copolymerizable therewith such as are well known in the polymer arts. Polymers of 1-monoolefins can be prepared by means known to the art, such as is disclosed by J. P. Hogan et al in United States Letters Patent No. 2,825,721, or by C. W. Moberly in the United States Letters Patent No. 3,403,140. Polymers of vinyl-substituted aromatic compounds usually are prepared from monomers of up to about 12 carbon atoms per molecule, although larger monomers molecules are often used. Methods of preparing such polymers, and others described above, are well known in the polymer arts.

EXAMPLES

Illustrative of the scope of our invention, and without intending to be limitative in any manner, are runs which illustrate the unique and surprising nature of effectiveness of our organophosphites as we have discovered them in use in conjunction with nickel complexes.

Various combinations of a nickel ultraviolet stabilizer with and without our organophosphites and with other types of organic phosphites, were added to polymers in order to determine effectiveness as ultraviolet light stabilizers.

The polymer used in the runs was a polyolefin, a polypropylene, and was prepared by conventional means by polymerizing propylene by means of a stereospecific catalyst system, $TiCl_3 \cdot 1/3\ AlCl_3$ and diethylaluminum chloride, to give a substantially crystalline polymer containing less than about 5 per cent amorphous polymer. The melt flow of the polypropylene was about 12 (ASTM D 1238-62T Condition L), its density was about 0.905 g/cc, and its melting point (determined optically) was about 340° F. The polymer contained conventional commercial additives such as antioxidant and processing aid.

The polymer formulations contained about 0.96 per cent, based on fiber weight, of fast red BR FPP as colorant. The fast red BR FPP was contained in D-1333, a colorant/polypropylene masterbatch containing 25 weight per cent colorant and sold by Imperial Color & Chemical Department of Hercules, Inc. In actual practice, the masterbatch was let down with enough of the basic resin formulation so that this final blend contained the various ingredients as previously enumerated. Crimped tow was prepared from fiber melt spun from the formulations.

The nickel complex used as exemplary was [2,2'-thiobis(4-t-octyl-phenolato)]n-butylamine nickel (II), representative of a type of complex commonly used as an ultraviolet light stabilizer in many polymers. This nickel complex was used alone, or with various phosphite additives.

All tests were run in a modified Weather-Ometer with the treated polyolefin utilized being in the form of a 4,000 denier (18denier per filament) scarlet crimped tow. Values reported are in the time in hours to decrease tenacity to 1 gpd.

TABLE I

| Run No. | Nickel stabilizer (php) (a) | Phosphite Additive Php (a) | Weather Ometer Results |
|---|---|---|---|
| 1 | 1.2 | None | 430 |
| 2 | 1.2 | 0.1 organophosphite(b) | 545 |
| 3 | 1.2 | 0.5 organophosphite(b) | 505 |
| 4 | 1.6 | None (b) | 575 |
| 5 | 1.6 | 0.3 organophosphite(b) | 680 |
| 6 | 1.6 | 0.1 phenyldidecyl phosphite | 560 |
| 7 | 1.6 | 0.3 phenyldidecyl phosphite | 550 | a php = parts by weight per 100 parts of polymer.
b Phosphite extended t-butylated bisphenol A, as described hereinabove wherein n = 1.

The tests tabulated above show by Runs 2, 3 and 5, the sharp effectiveness of our organophosphites in increasing the protection obtainable by the nickel complex according to our invention. Furthermore, the comparison in the last two runs, Runs 6 and 7 above, clearly show the complete non-effectiveness, even harmful effect, of other commercially available organic phosphites in combination with the nickel complexes.

Futther comparative runs were made with additional commercially organic available phosphites, using the procedure as described in Example I, with the following results:

TABLE II

| Run No. | Nickel stabilizer-php php | Phosphite Additive php | Weather Ometer Results |
|---|---|---|---|
| The following runs were made on scarlet crimped two | | | |
| 8 | 1.2 | None | 417 |
| 9 | 1.2 | 0.1 dioctyl phosphite | 420 |
| 10 | 1.2 | 0.3 dioctyl phosphite | 395 |
| 11 | 1.2 | None | 417 |
| 12 | 1.2 | 0.5 distearyl pentaerythritol diphosphite | 427 |
| The following runs were made on white crimped tow which had a formulation the same as the scarlet tow described above except containing 1 weight per cent of titanium dioxide in place of the red colorant. | | | |
| 13 | 1.9 | 0.1 dioctyl phosphite | 880 |
| 14 | 1.9 | 0.1 hydrogenated 4,4'-isopropyl-idene diphenol phosphite | 950 |
| The following runs were made on a 5 mil film | | | |
| 15 | 0.5 | None | 953 |
| 16 | 0.5 | 0.1 trisnonylphenyl phosphite | 860 |

Runs 2, 3 and 5 above showing results of our organophosphite-nickel complex combination stabilizer system according to our invention conclusively demonstrate the high degree of effectiveness. Various other types of organic phosphites either produce little beneficial effect, or for the most part even decrease effectiveness of the nickel complexes.

Reasonable variations and modifications of our invention are possible within the scope of our disclosure, without departing from the spirit and scope thereof as disclosed in the specification hereinabove and the claims hereinafter.

We claim:

1. A composition of matter useful for stabilizing polymers which comprises a mixture of
   a. a nickel amine complex of a 2,2'-thiobis(4-alkylphenol) wherein the complex-forming amine is a member selected from the group consisting of ammonia, primary aliphatic amines, primary aromatic amines and cyclic secondary amines, said complex being characterized by a nickel complex to amine molar ratio of 1:1; and
   b. an organophosphite represented by the formula:

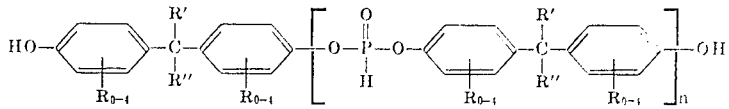

wherein each R, R', and R'' contains up to 20 carbon atoms and is individually selected from hydrogen, alkyl, cycloalkyl, aryl, aralkyl, and alkaryl; the number of groups per ring is 0 to 4; and $n$ is an integer of 1 to 5; the weight ratio of component (a) to component (b) being within the range of 20:1 to 1:1.

2. The composition of claim 1 wherein component (a) is [2,2'-thiobis(4-t-octyl-phenolato)]n-butylamine nickel (II).

3. The composition of claim 1 wherein, in the organophosphite, R is t-butyl, there is one R group per ring, each R' and R'' is methyl and $n$ is 1.

4. The composition of claim 3 wherein the nickel amine complex is [2,2'-thiobis(4-t-octyl-phenolato)]n-butylamine nickel (II).

5. A stabilized polyolefin composition comprising a polymer of an aliphatic 1-olefin stabilized with a mixture of
   a. 0.02 to 2.5 parts by weight per hundred parts of polymer of a nickel amine complex of a 2,2'-thiobis(4-alkylphenol) wherein the complex-forming amine is a member selected from the group consisting of ammonia, primary aliphatic amine, primary aromatic amine and cyclic secondary amine and said nickel complex and said amine are present in a molar ratio of 1:1; and
   b. 0.01 to 1 parts by weight per hundred parts of polymer of an organophosphite represented by the formula:

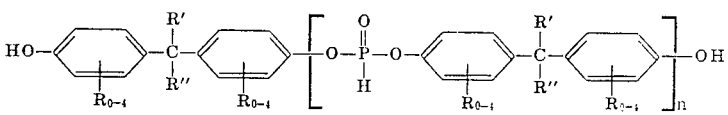

wherein each R, R', and R'' contains up to 20 carbon atoms and is individually selected from hydrogen, alkyl, cycloalkyl, aryl, aralkyl, and alkaryl; the number of groups per ring is 0 to 4; and $n$ in an integer of 1 to 5.

6. The composition of claim 5 wherein the polyolefin is a homopolymer or copolymer of an aliphatic 1-monoolefin having from two to eight carbon atoms per molecule.

7. The composition of claim 6 wherein said polymer is a polymer of propylene.

8. The composition of claim 5 wherein component (a) is [2,2'-thiobis(4-t-octyl-phenolato)]n-butylamine nickel (II).

9. The composition of claim 5 wherein, in the organophosphite, R is t-butyl, there is one R group per ring, each R' and R'' is methyl and $n$ is 1.

10. The composition of claim 9 wherein the polyolefin is a polymer of propylene and the stabilizer is [2,2'-thiobis(4-t-octyl-phenolato)]n-butylamine nickel (II).

* * * * *